(12) United States Patent
Birrell et al.

(10) Patent No.: US 7,380,051 B2
(45) Date of Patent: May 27, 2008

(54) SYSTEM AND METHODS FOR AN OVERLAY DISK AND CACHE USING PORTABLE FLASH MEMORY

(75) Inventors: Andrew Birrell, Los Altos, CA (US); Edward P. Wobber, Menlo Park, CA (US); Muthukaruppan Annamalai, Seattle, WA (US); Ulfar Erlingsson, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 11/058,950

(22) Filed: Feb. 15, 2005

(65) Prior Publication Data

US 2006/0233367 A1    Oct. 19, 2006

Related U.S. Application Data

(63) Continuation of application No. 11/032,775, filed on Jan. 10, 2005.

(51) Int. Cl.
*G06F 12/14* (2006.01)
*G06F 12/16* (2006.01)
*H04L 9/32* (2006.01)

(52) U.S. Cl. .................... 711/103; 726/24; 713/188
(58) Field of Classification Search ................. 711/103
See application file for complete search history.

(56) References Cited

U.S. PATENT DOCUMENTS 6,199,163 B1 * 3/2001 Dumas et al. ............... 713/183

2002/0124130 A1 * 9/2002 Iida et al. .................... 711/103
2004/0039924 A1 * 2/2004 Baldwin et al. ............. 713/189

OTHER PUBLICATIONS

Sapuntzakis, S. P. et al., "Optimizing the Migration of Virtual Computer," ACM SIGOPS Operating Systems Review, 2002, vol. 36, pp. 377-390.*

* cited by examiner

*Primary Examiner*—Hyung S. Sough
*Assistant Examiner*—Shawn Eland
(74) *Attorney, Agent, or Firm*—Woodcock Washburn LLP

(57) ABSTRACT

A system is provided for reading and writing sectors which may be realized as either a disk device to the local operating system, or as a virtual disk device to a virtual machine. A user's computing environment is stored in the network in the form of a disk image, which may be a virtual disk image, for example. The virtual disk is realized on host computers through host-resident virtual machine monitors such as MICROSOFT VIRTUAL PC®. Portable memory devices, such as flash devices, buffer virtual disk writes and cache reads, greatly reducing the performance degradation associated with remote disk access. The cache is mobile so that it can be travel with the user. The flash device remembers commonly used virtual disk content fingerprints so that the host machine's local disk can be used to satisfy many common disk reads when ubiquitous static content is involved. Standard, frequently used software images might be distributed in advance to host machines. Flash disk contents are trickled back into the networked parent disk image in order to provide an automatic backup facility, adding the benefit of ensuring that the flash drive doesn't overflow.

20 Claims, 7 Drawing Sheets

SYSTEM AND METHODS FOR AN OVERLAY DISK AND CACHE USING PORTABLE FLASH MEMORY

CROSS REFERENCE TO RELATED APPLICATIONS

This application is a continuation of U.S. patent application Ser. No. 11/032,775 filed Jan. 10, 2005, entitled "System and Methods for an Overlay Disk and Cache Using Portable Flash Memory."

This application is related to commonly assigned copending U.S. patent application Ser. No. 11/059,124 filed on Feb. 15, 2005, entitled, "System and Methods for an Overlay Disk and Cache Using Portable Flash Memory."

FIELD OF THE INVENTION

The present invention relates generally to mobile computing environments and specifically to using a portable memory device to realize a portable cache, exploit local content and provide a differencing drive, (i.e., an overlay drive). The terms differencing drive and overlay drive may be used interchangeably in the present patent application.

BACKGROUND OF THE INVENTION

Mobility of large amounts of data and applications is becoming increasingly important as the size of typical applications and associated files within a user's computing environment is ever increasing. A user's computing environment is defined herein as data and/or programs associated with a particular user that allow the user to interact with a computer in a particular fashion. An example of this may include a user's operating system, software applications and data stored on a disk. It has become commonplace for mobile computer users to carry laptops to bring their computing environments with them. In many cases, this arrangement is less than optimal. Laptops are heavy, bulky, fragile, and subject to theft. Moreover, the user cannot easily choose a computer with resources appropriate to the task at hand. Instead, a single laptop must suffice for everything. Roaming profiles as they exist in the MICROSOFT WINDOWS® operating system today do not solve this problem. The performance of the required remote file access is often insufficient and in practice only a fraction of the user's computing environment is actually ported from desktop to desktop. For example, application settings might move but not applications or the "My Documents" folder.

Remote desktop (terminal server) programs are not a full solution either, since desktop-remoting is not always workable over high-latency lines and the protocols involved are often blocked by firewalls. Moreover, in many environments users maintain personal control over their desktops which makes such machines an unreliable target for remote access.

The advent of cheap, portable, particularly flash-based storage devices, offers the possibility of carrying a computing environment on one's keychain or in a mobile phone. Familiar flash devices can be used for this purpose as they easily plug-in to desktop hardware that is becoming both cheap and ubiquitous.

However, it doesn't work well to treat the flash device as a desktop primary disk. Booting from flash devices is generally not supported. It is not desirable that the flash device dictate the configuration of the host computer since the flash device will often be used in concert with different host hardware configurations. Flash devices can be easily lost or damaged, and therefore a strong backup strategy is needed. Furthermore, rotating disk hardware will outpace solid-state hardware in bytes per unit cost for some time to come. Therefore, it is arguable whether limited space flash devices will ever have acceptable capacity compared to desktop or laptop disks.

In view of the above problems, it would be beneficial to utilize portable memory devices to enable users to carry with them their computing environment without having to store the entire contents of the computing environment on the portable memory device. It would be yet be a further advantage to have an automatic backup facility in connection with using the portable memory device.

SUMMARY OF THE INVENTION

In view of the foregoing, the present invention provides a system and method for managing data that provides portable and stable storage and wherein the system also acts as a working subset of a potentially larger networked disk. The method comprises storing data as a disk image and storing changes to a state of the disk image on a portable memory device. The portable memory device is connected externally to a computing device, is removable by a user and stores data in a non-volatile fashion. A flash memory device is an example of a portable memory device. A flash memory device is defined as a special type of electrically erasable programmable read-only memory device (EEPROM) that can be erased and reprogrammed in blocks instead of one byte at a time. Particularly, the data may, for example, be a user's computing environment. Furthermore, the changes to the state of the disk image stored on the portable memory device may be changes in addition to changes to the state of the disk image stored on another memory device.

Particularly, the act of storing changes comprises buffering at least one write to the disk image using the portable memory device and caching at least one read from the disk image using the portable memory device. Writes to the portable memory device are the only actual changes in the disk image state. The portable memory-based read cache is a performance enhancement.

The invention may also be characterized as a system component for reading and writing sectors. The component may be realized as either a disk device to the local operating system, or as a virtual disk device to a virtual machine. For example, in one embodiment a system is provided for storing data comprising a host computer having a virtual machine running thereon and a portable memory device operably connected to the host computer. The memory device is configured to store changes to a state of a virtual disk image corresponding to the virtual machine. The memory device may be, for example, a removable flash memory device. The system may comprise further a remote differencing disk in communication with the virtual machine. The changes to the state of the virtual disk image that may be stored on a portable memory device may be changes in addition to changes to the state of the virtual disk image stored on the remote differencing disk.

Other features of the present invention are described below.

BRIEF DESCRIPTION OF THE DRAWINGS

The system and methods for a virtual overlay disk and cache using portable memory device are further described with reference to the accompanying drawings in which.

DETAILED DESCRIPTION OF ILLUSTRATIVE EMBODIMENTS

Overview

The present invention provides a method and system utilizing portable memory devices, to buffer virtual disk writes and cache reads, greatly reducing the performance degradation associated with remote disk access. The cache on the portable device is mobile so that it can travel with the user. A portable memory device is also used to remember commonly used disk content fingerprints so that the host machine's local disk can be used to satisfy many common disk reads when ubiquitous static content is involved.

First, exemplary computing and network environments will be described, followed by a description of the system components and then by a description of the system operation.

Exemplary Computer and Network Environments

Figure 1:
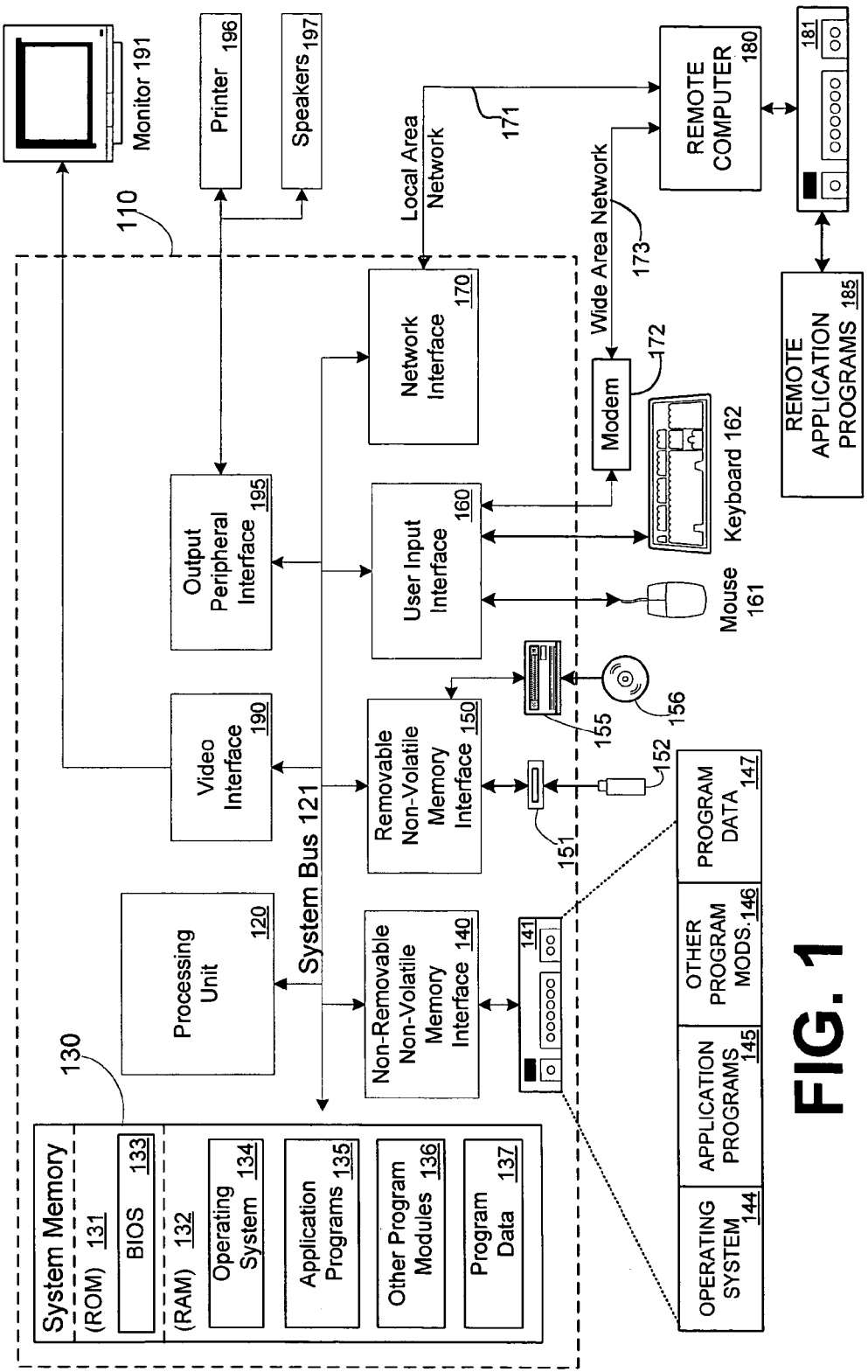
FIG. 1 is a block diagram representing an exemplary suitable computing system environment in which the present invention may be implemented.

FIG. 1 and the following discussion are intended to provide a brief general description of a suitable computing environment in which the invention may be implemented. Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, gaming platforms and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. For example, mobile computing environments may be useful in a wide range of platforms. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a universal serial bus (USB) interface 151 that reads from or writes to a removable, nonvolatile flash memory disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, floppy disks, digital versatile disks, digital video tape, solid state RAM, solid state ROM, external hard disk drives, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
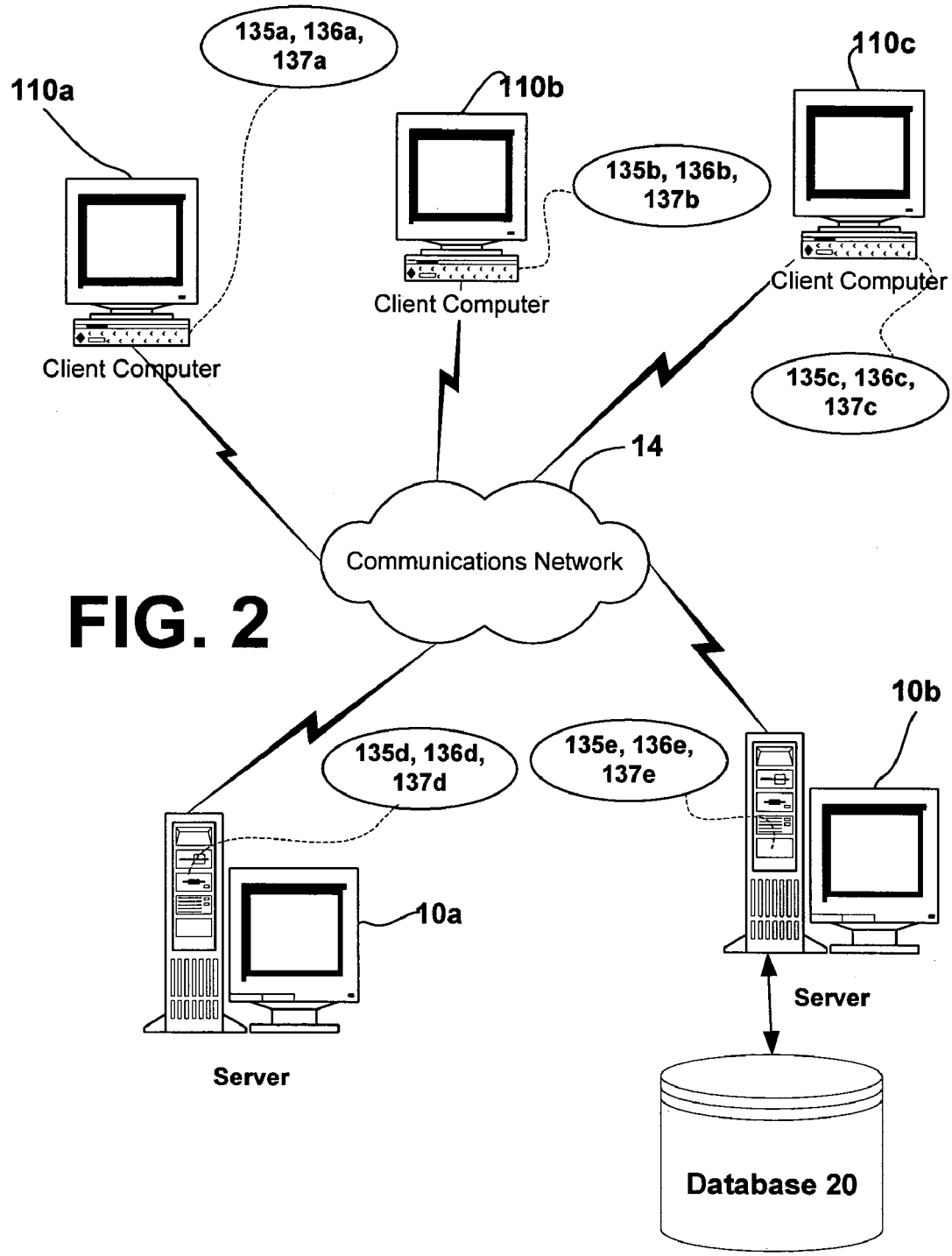
FIG. 2 is a block diagram representing an exemplary network environment in which the present invention may be implemented.

As mentioned, a computer, such as described above, can be deployed as part of a computer network. Further, the present invention pertains to any computer system having any number of memory or storage units, and any number of applications and processes occurring across any number of storage units or volumes. Thus, the present invention may apply to both server computers and client computers deployed in a network environment, having remote or local storage. FIG. 2 thus illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 110a, 110b, 110c, etc. In a network environment in which the communications network 14 is the Internet, for example, servers 10 can be Web servers with which the clients 110a, 110b, etc. communicate via any of a number of known protocols such as hypertext transfer protocol (HTTP). The invention may also leverage peer to peer networking techniques. Each client computer 110 and server computer 10 may be equipped with various application program modules 135, other program modules 136 and program data 137, and with connections or access to various types of storage elements or objects, across which files may be stored or to which portion(s) of files may be downloaded or migrated. Each client computer 110 and server computer 10 may also be connected to additional storage elements 20, such as a database. Thus, the present invention can be utilized in a computer network environment having client computers for accessing and interacting with a network and server computers 10a, 10b, etc. for interacting with client computers.

System Components

Figure 3:
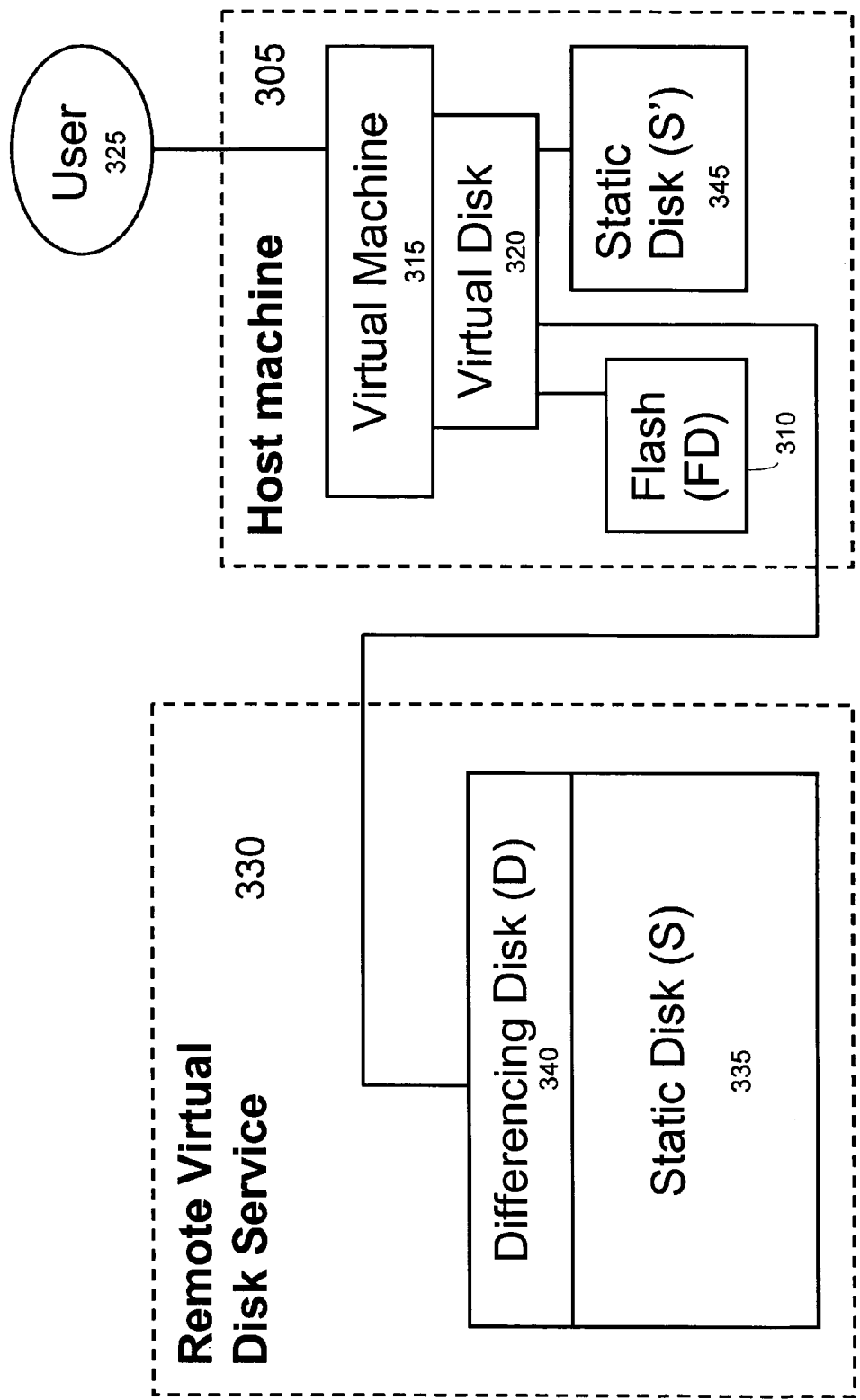
FIG. 3 is a block diagram illustrating a system level view of a host machine and associated network server according to the present invention.

Referring to FIG. 3, shown is a block diagram illustrating a system level view of a host machine and associated network server according to the present invention. Shown is a host machine 305 where a virtual machine monitor 315, such as MICROSOFT VIRTUAL PC® (VPC), for example, or other virtual machine monitors (VMM) may run. Also, VPC is an example of a virtual machine monitor, that, for example, can host multiple virtual machines (e.g., running MICROSOFT WINDOWS® as a guest operating system). A VMM is a layer of software that sits directly on the raw hardware and exports a virtual machine abstraction that imitates the real machine well enough that software developed for the real machine also runs in the virtual machine. A portable memory device, such as a flash device 310 is connected to the host machine 305. A wide range of acceptable portable memory devices is available and suitable, but high-speed flash based USB-disks such as the SANDISK ULTRA II® with a USB adapter, for example, are particularly suitable. A preferable minimum memory size for the flash device is 1 GByte, although other memory sizes may be adequate. The virtual machine 315, which, for example, may be running under the host machine's 305 VMM application has an underlying virtual disk representation 320 in operable communication with the flash disk (FD) 310 and a static disk 335 (S) and S' 345.

The user's 325 computing environment runs as a guest operating system inside the host's 305 VMM application 315. The user's 325 virtual disk 320 is an overlay disk wherein the contents of the disk are stored in a network server running a remote virtual disk service 330. It consists of a static image (S) 335, containing the operating system and a set of standard applications, for example, plus a differencing drive (D) 340 that holds changes to that state. This configuration is possible utilizing systems like VPC, for example. However, the interface of the overlay disk described herein offers to the virtual machine an interface that is very similar to the interface that an analogous system device might provide to the operating system. The main primitives are simply reads and writes of disk sectors. It is thus an alternative to implement a disk device driver that offers much the same interface and functionality using the data structures described herein. Therefore, the present invention should not be limited to those embodiments that are described in the context of a virtual machine.

The host machine 305 may contain a copy of the static image S 335 (called S' 345) so that some disk reads may be satisfied locally from S' 345. There is no requirement that S 335 exactly equal S' 345, but performance will improve with the similarity of S 335 and S' 345. Additional static images (S", ... ) containing software upgrades or other components loaded into the user's 325 disk image can be made available locally for the same purpose of improving performance.

The flash disk (FD) 310 acts as an additional differencing drive on top of the remote disk (D) 340. Described below is the implementation of that virtual disk 310. The implementation helps facilitate disk sector write and read operations using flash memory 310. An aggregate virtual disk can be thought of as holding S+D+FD.

Figure 4:
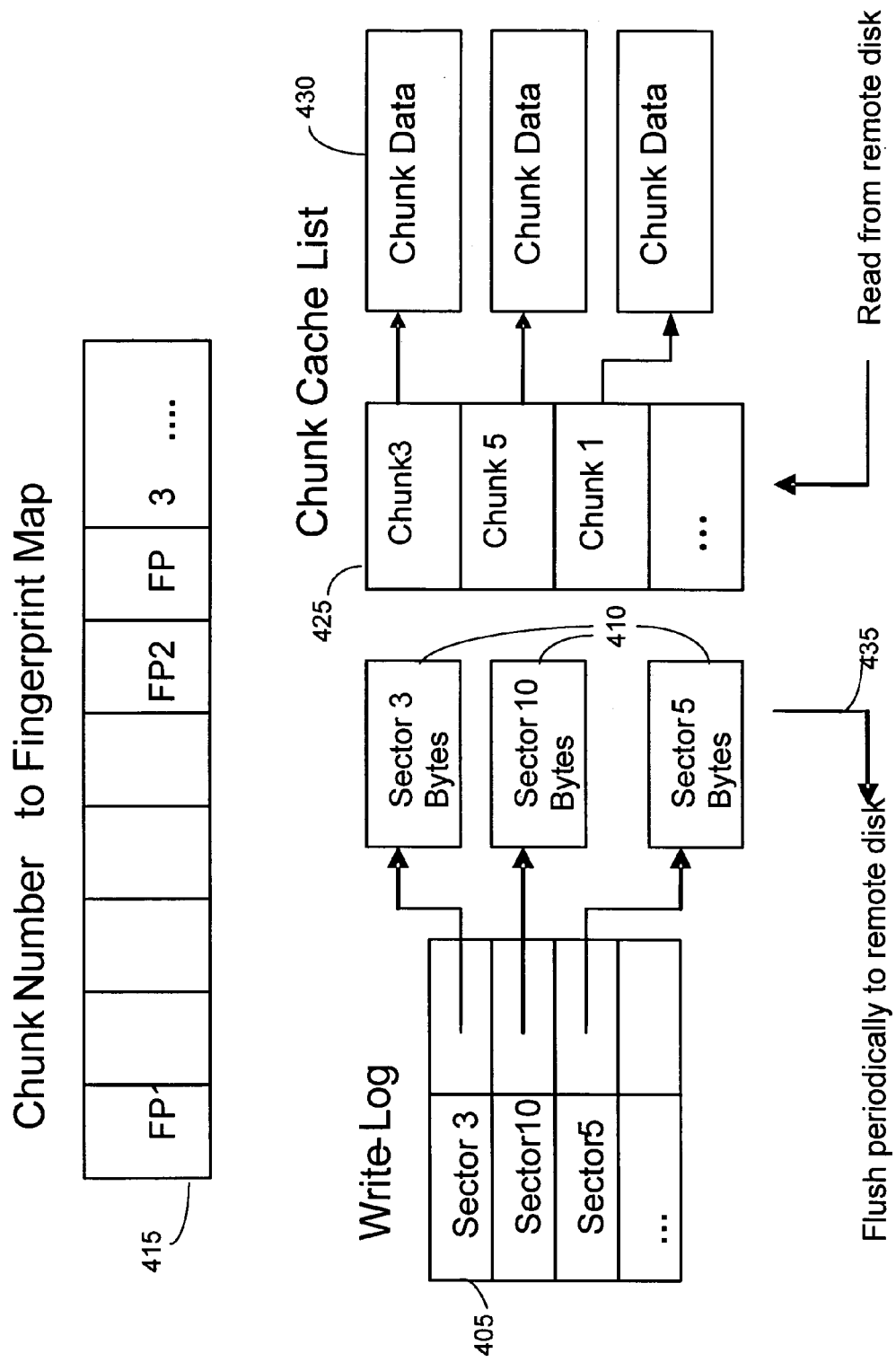
FIG. 4 is a diagram illustrating various data structures present on a memory disk according to the present invention.

Referring next to FIG. 4, shown is a diagram illustrating various data structures present on a memory disk according to the present invention. The flash disk 310 will hold 3 permanent data structures in addition to the virtual machine memory image (which is used by VPC to store the user's runtime memory state when the virtual machine is inactive). These data structures are a write log 405, a fingerprint (FP) array 415 and a chunk cache list 425.

A write-log 405 has one entry for each sector written. Each entry contains a sector number and a pointer to a sector buffer 410. The write-log 405 may be encoded in multiple files with names that encode the relative age the log entries. One might therefore be able to encode log position with file names. However, the flash device 310 may also be accessed through a memory interface (e.g. a write log entry at location ZZZ rather than a write log entry into file XXX at offset YYY). Since the write-log can traverse the flash disk 310, it is possible to avoid writing the same flash sector every time the same disk sector is written. This will help eliminate flash disk wear-leveling problems.

Figure 5:
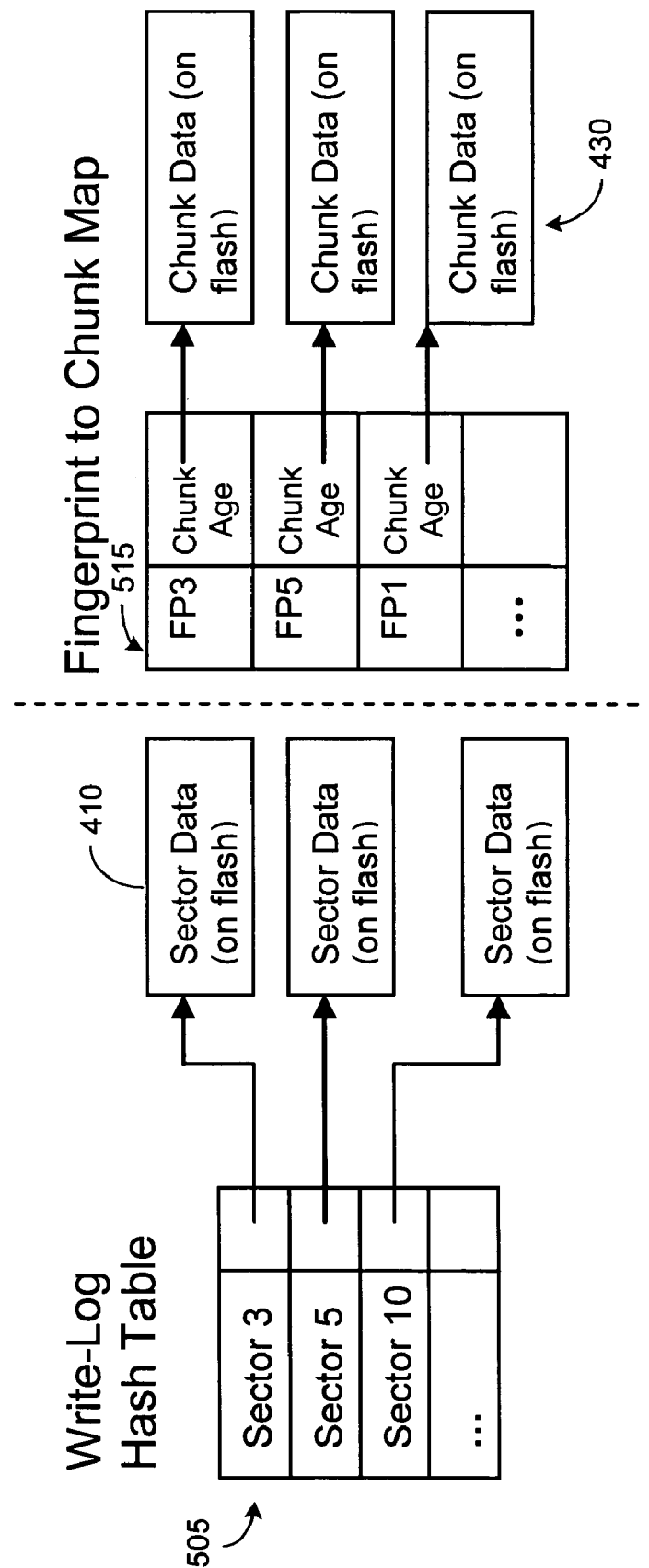
FIG. 5 is a diagram illustrating various data structures that are read into memory of a host machine according to the present invention.

Referring next to FIG. 5, shown is a diagram illustrating various data structures that are read into memory of a host machine according to the present invention. The log portion of the write-log 405 of FIG. 4 (but not the sector data) is read into memory of the host machine 305 at session startup forming a write-log hash table 505 indexed by sector number, as shown in FIG. 5. Each entry of the write-log hash table 505 contains a sector number and a pointer to the sector data 410 on the flash disk 310. These stable and in-memory data structures implement the differencing drive FD 310. Disk sectors are 512 bytes long, for example.

The FP array 415 is an array containing, for example, a 128-bit FP for each 16-KB chunk on the aggregate virtual disk. However, the fingerprint algorithm, size of fingerprint, and chunk size need not be exactly as described herein, as other sizes and algorithms may also be suitable to obtain the same result. Also, it is not required that the entire FP array 415 fit onto the flash memory device 310. The FP array 415 itself could be fetched from the remote disk 340 in smaller chunks and cached. A crypto-hash algorithm such as MD5 is used for a fingerprint function, although other suitable crypto-hash routines may be used. The MD5 algorithm takes as input a message of arbitrary length and produces as output a 128-bit "fingerprint" or "message digest" of the input. It is conjectured that it is computationally infeasible to produce two messages having the same message digest, or to produce any message having a given pre-specified target message digest. Optimally, the local static disk S' 345 and the remote static S 335 and differencing drive D 340 can be efficiently indexed by FP. An in-memory data structure describing each disk would enable this.

The FP array 415 may be implemented using multiple files with names that encode a position in the array. This would make extension of the array easier. However, the FP array might also be accessed through a memory interface.

The chunk cache list 425 is a list of 16-KB chunks currently resident on the flash disk 310. Each entry in the chunk cache list 425 contains a sector index and a pointer to a chunk buffer 430. The list portion of this data structure (but not the chunk data) is read into memory of the host machine 305 at startup forming a hash table, for example, indexed by FP, which is shown in FIG. 5 as the fingerprint to chunk map 515 having pointers to the chunk data 430 on the flash device 310 and the age of each chunk as determined by when each chunk was read. The fingerprint of any given disk chunk is available from the FP array 415 of FIG. 4.

The write-back log 405 block size is small in order to make writes back to the network as efficient as possible, and also because the virtual disk implementation has little control over the block size for writes. On the other hand, chunks (e.g. the read cache) are large in order to minimize the amount of memory on the flash disk 310 needed to store (or cache) the fingerprints of the entire virtual disk. Moreover, reading data in larger chunks will likely help facilitate disk read-ahead policies in many situations. Also, if the log position in the write-back log 405 is being encoded with file names, one could rename the file to indicate that the log had been written-back.

System Operation

Figure 6:
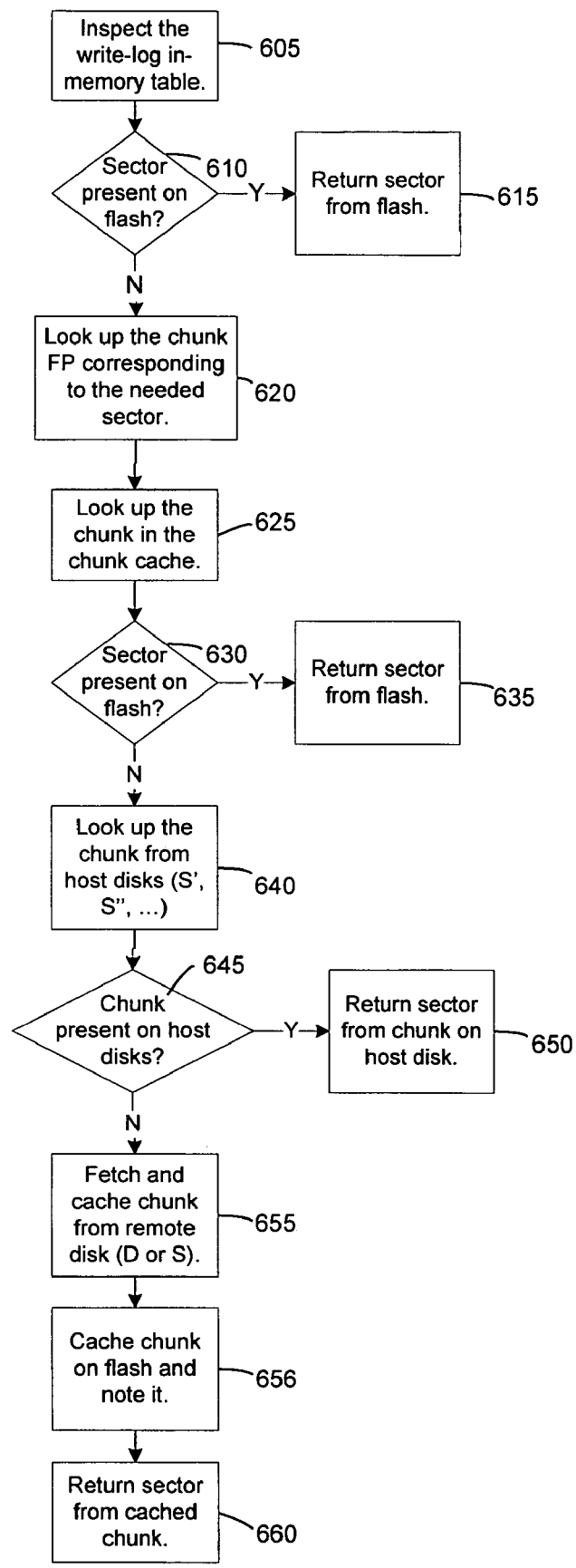
FIG. 6 is a flow chart illustrating the sector reading process according to the present invention.

Referring next to FIG. 6, shown is a flow chart illustrating the process for reading a disk sector according to the present invention. In order to help understand and implement the processes described herein, described next is an explanation and general operation of a typical cache system. A cache memory system relies on the fact that a small memory can be made faster than a large one. If the small memory can be made to contain the most frequently used data items or instructions, then the average memory access time for the system will be closer to that of the faster memory than the slower one. The usual method of ensuring that the most frequently used items reside in the cache is for the cache to contain the most recently used items. In a direct mapped cache the least significant address bits (LSB) within the cache are matched to those of the corresponding word in main memory.

In the present embodiment, to read a disk sector, the write-log hash table 505 is first inspected. If the sector is present 610 on the flash disk 310, it is returned 615. If the sector is not present on the flash disk 310, then the chunk FP corresponding to the needed sector is looked up 620 on the chunk number to fingerprint map 415. Then the chunk is looked up 625 in the chunk cache 515. If the chunk is present 630 on the flash disk 310, the needed sector is returned 635 from there. If the chunk is not present on the flash disk 310, the chunk is looked up on the host machine 305 disks 345 (S', S", . . . ) and the needed sector returned 650, if found 645 on the host machine 305 disks 345 (S', S", . . . ). If the chunk is not present on the host machine 305 disks 345 (S', S", . . . ), then the chunk is fetched 655 from the remote disk D 340 or S 345. Subsequently, the chunk is cached 656 on-flash 425 and noted 515 and the needed sector returned 660. Note that the cached or fetched chunk need not reflect the most recent state for all sectors in the chunk. This is because the write log 405 is an overlay on differencing disk D 340. The chunk cache list 425 represents a cache of S 345+D 340, therefore the most recent sector will always be returned as long as the write log 405 is consulted before the chunk cache list 425, even if such sectors have not been written back to D 340. Writes are performed as simple appends to the write log 405. The chunk number to fingerprint map 415 and chunk cache list 425 may, for example, be read into memory only at startup, and then flushed back later to the flash device 310. Alternatively, these structures may be updated routinely during a session.

Backup and write-log overflow prevention is accomplished by trickling 435 the write-log 405 data back to the remote differencing disk D 340 in background. Because the write-log 405 is flushed in write order, the remote virtual disk stored (S 345+D 340) will always be in a recoverable state. The flash-based write-log 405 can maintain sectors after they have been written back, however if a sector is flushed altogether from the table 405, then the chunk FP in the chunk number to fingerprint map 415 must be recomputed. This might involve fetching the entire chunk in order to compute the fingerprint.

Write-backs to the remote disk D 340 may be stored in a secondary remote differencing disk D'. D' would then be periodically and atomically merged into D. This would allow the system to guarantee stronger properties about 345 S+D 340, such as the remote copy of the virtual disk always being in some known good state. Also, an entire chunk of sectors can be written back at once and copied directly into the chunk cache 425. In addition, the write-log 405 may be scanned in order to avoid re-flushing repetitively written sectors.

The virtual machine 315 memory state can be flushed periodically to the flash disk 310 during a user session. The flash disk 310 should hold this memory state in order to promote portability of the user's entire state. Also, if the memory state can be associated with a particular write-log position, then the contents of the memory state plus the write-log 405 up to that point would represent a complete system checkpoint. This would allow a user 325 to rollback from subsequent failure to a known good point in the past.

Also, the user's operating system can be "enlightened", that is made aware of the fact that it is running inside a virtual machine. If the OS is aware that its disk is a virtual overlay disk, it can ensure that all unused disk sectors and/or memory regions are filled with one particular pattern (e.g., zero filled) to speed up communication and allow compression of the various flash-disk 310 data structures 405 415 425. Additionally, the user's operating system can be enlightened so as to avoid writing temporary files to the virtual disk. For example, temporary files can be written to a RAM disk which would be deleted prior to the end of a user session. This would reduce the size of the write log which must be stored on flash.

In accordance with an aspect of the invention, a technique for software virus prevention is to scramble code segments to produce a different layout (but equivalent function) on each different machine. The virtual disk 320 design offers a mechanism to map from logical content hash to physical disk block. Given a means to convert between machine-specific code layout and a canonical form, the content mapping scheme disclosed herein may be used to retrieve an equivalent copy of a code block from local media that can be canonicalized and re-scrambled for use on the virtual machine 315.

An equivalent process for security updates is also an aspect of the present invention. Since one can not assume that all host machines 305 will hold all versions of all security updates for all virtual disks 320, it would instead be desirable to be able to compute the code necessary to implement a correctly patched function from what exists on the local machine 305, since that will be more efficient than fetching it from the user's remote disk D 340. This is accomplished by mapping from the hash of a canonicalized function to the version of that function available from the local S' 345, presuming that in many cases, the up-to-date correct version of the function for the user's virtual disk 320 can be deterministically computed from the canonical version. This is likely because security patches can be represented very efficiently in comparison to the size of the modules being patched.

Figure 7:
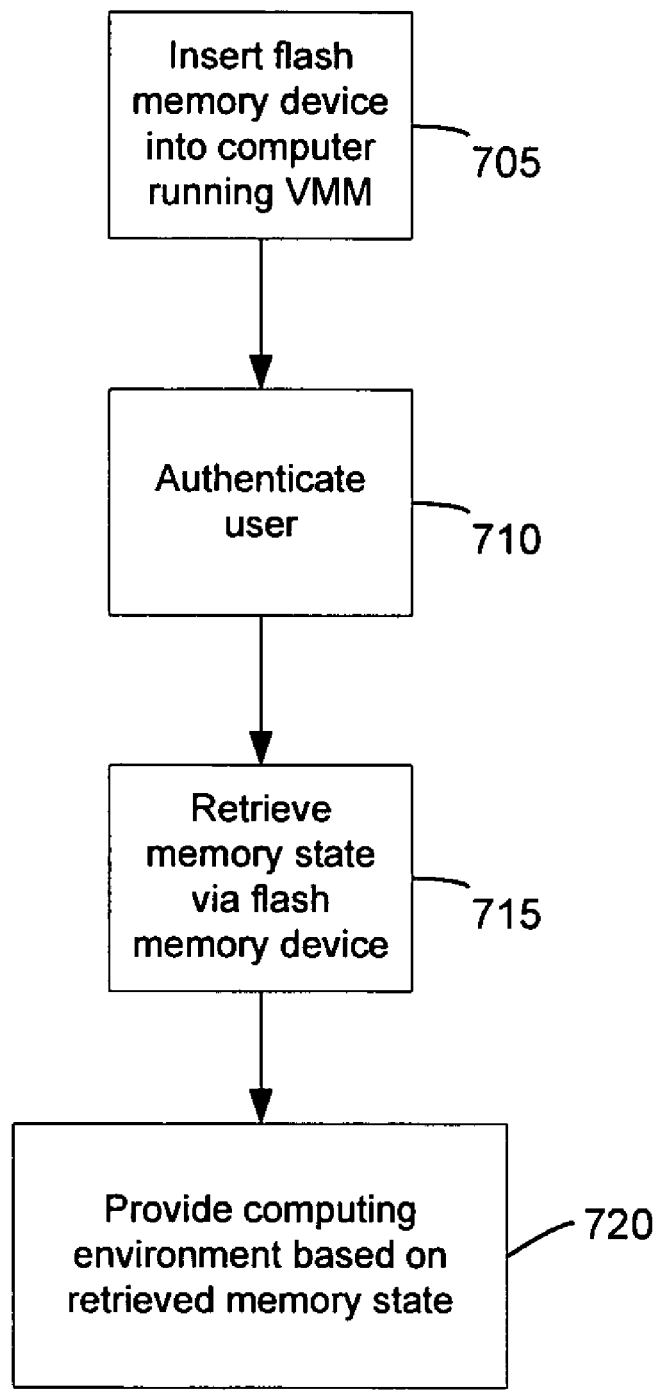
FIG. 7 is a process flow diagram illustrating a process of restoring a user's computing environment on a host computer according to the present invention.

Referring next to FIG. 7, shown is a process flow diagram illustrating a process of restoring a user's computing environment on a host computer according to the present invention. First, a users inserts a flash memory device into a computer running a VMM 705. Then the user is authenticated 710 in some fashion such as in a logon process, for example, to verify the user is authorized to access the particular desired computing environment to be restored. Next, a memory state is retrieved 715 that is associated with a previously saved computing environment via the flash memory device using the methods described above, for example, in creating and maintaining a virtual disk image associated with the computing environment to be restored. The particular computing environment associated with the virtual disk image is then provided to the user 720 on the host computing device, such as by displaying the environment on the computing device with which the user may interact.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context storing data and running a virtual machine in a PC with a general operating system, one skilled in the art will recognize that the present invention is not limited to the PC, and that running a virtual machine and implementing a differencing disk may apply to any computing device, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed:

1. A method for software virus prevention comprising:
    scrambling functionally equivalent code segments located on a plurality of different computers to form a machine-specific code layout unique to each computer in the plurality of computers, the unique machine-specific code layout on each computer being different from the machine-specific code layout on any other computer and thus being unrecognizable to a software virus;
    retrieving a scrambled code block from a first computer of the plurality of computers that is functionally equivalent to a code block of a second computer of the plurality of computers;
    converting the retrieved scrambled code block so as to de-scramble the code segments from the unique machine-specific code layout of the first computer to a canonical form that is non-unique to any particular one of the plurality of computers;
    re-scrambling the converted code block for use on a particular virtual machine running on any one of the plurality of computers, the re-scrambled code block being in a virtual-machine-specific code layout unique to the particular virtual machine such that the unique virtual-machine-specific code layout on the particular virtual machine is different from the virtual-machine-specific code layout on any other virtual machine and thus being unrecognizable to a software virus;
    storing data as a virtual disk image on the particular virtual machine using a static disk (S) and a differencing disk (D) that are stored in a server running a remote virtual disk service;
    storing changes to a state of the virtual disk image on a portable memory device that includes a write log for storing an entry for each sector written, a chunk cache list that lists memory chunks currently residing in the portable memory device and a fingerprint array that contains a fingerprint for each memory chunk;
    buffering at least one read from the virtual disk image using the portable memory device
    flushing a memory state of the particular virtual machine associated with the virtual disk image to the portable memory device; and
    associating the memory state with a particular position on the write log on the portable memory device.

2. The method according to claim 1 wherein the act of retrieving comprises:
    mapping from a logical content hash to a physical disk block; and
    retrieving the physical disk block found.

3. The method according to claim 2 wherein the act of mapping comprises:
    looking up, in the fingerprint anay, a chunk fingerprint corresponding to the sector; and
    looking up a chunk corresponding to the chunk fingerprint in the chunk cache and returning the sector if the chunk is present.

4. The method according to claim 3 wherein the fingerprint array is implemented using multiple files with names that encode a position in the array.

5. The method according to claim 3 wherein the virtual machine is running on a host computer within the plurality of computers and wherein a portable memory device is operably connected to the host computer, said memory device configured to store changes to a state of a virtual disk image conesponding to the virtual machine.

6. The method according to claim 5 wherein the portable memory device is a removable flash memory device.

7. The method according to claim 6 wherein the flash memory device is of sufficient size to store a user's computing environment.

8. A computer readable storage medium having stored thereon instructions for performing a method of software virus prevention comprising:
    scrambling functionally equivalent code segments located on a plurality of different computers to form a machine-specific code layout unique to each computer in the plurality of computers, the unique machine-specific code layout on each computer being different from the machine-specific code layout on any other computer and thus being unrecognizable to a software virus;
    retrieving a scrambled code block from a first computer of the plurality of computers that is functionally equivalent to a code block of a second computer of the plurality of computers;

converting the retrieved scrambled code block so as to de-scramble the code segments from the unique machine-specific code layout of the first computer to a canonical form that is non-unique to any particular one of the plurality of computers;

re-scrambling the converted code block for use on a particular virtual machine running on any one of the plurality of computers, the re-scrambled code block being in a virtual-machine-specific code layout unique to the particular virtual machine such that the unique virtual-machine-specific code layout on the particular virtual machine is different from the virtual-machine-specific code layout on any other virtual machine and thus being unrecognizable to a software virus;

storing data as a virtual disk image on the particular virtual machine using a static disk (S) and a differencing disk (D) that are stored in a server running a remote virtual disk service;

storing changes to a state of the virtual disk image on a portable memory device that includes a write log for storing an entry for each sector written, a chunk cache list that lists memory chunks currently residing in the portable memory device and a fingerprint array that contains a fingerprint for each memory chunk;

buffering at least one read from the virtual disk image using the portable memory device flushing a memory state of the particular virtual machine associated with the virtual disk image to the portable memory device; and associating the memory state with a particular position on the write log on the portable memory device.

9. The computer readable medium according to claim 8 wherein the act of retrieving comprises:

mapping from a logical content hash to a physical disk block; and retrieving the physical disk block found.

10. The computer readable medium according to claim 9 wherein the act of mapping comprises:

looking up, in the fingerprint array, a chunk fingerprint corresponding to the sector; and looking up a chunk coffesponding to the chunk fingerprint in the chunk cache and returning the sector if the chunk is present.

11. The computer readable medium according to claim 10 wherein the fingerprint array is implemented using multiple files with names that encode a position in the array.

12. The computer readable medium according to claim 10 wherein the virtual machine is running on a host computer within the plurality of computers and wherein portable memory device is operably connected to the host computer, said memory device configured to store changes to a state of a virtual disk image corresponding to the virtual machine.

13. The computer readable medium according to claim 12 wherein the portable memory device is a removable flash memory device.

14. The computer readable medium according to claim 13 wherein the flash memory device is of sufficient size to store a user's computing environment.

15. A system for software virus prevention comprising:

means for scrambling functionally equivalent code segments located on a plurality of different computers to form a machine-specific code layout unique to each computer in the plurality of computers, the unique machine-specific code layout on each computer being different from the machine-specific code layout on any other computer and thus being unrecognizable to a software virus;

means for retrieving a scrambled code block from a first computer of the plurality of computers that is functionally equivalent to a code block of a second computer of the plurality of computers;

means for converting the retrieved scrambled code block so as to de-scramble the code segments from the unique machine-specific code layout of the first computer to a canonical form that is non-unique to any particular one of the plurality of computers;

means for re-scrambling the converted code block for use on a particular virtual machine running on any one of the plurality of computers, the re-scrambled code block being in a virtual-machine-specific code layout unique to the particular virtual machine such that the unique virtual-machine-specific code layout on the particular virtual machine is different from the virtual-machine-specific code layout on any other virtual machine and thus being unrecognizable to a software virus, wherein the scrambling, retrieving, converting and re-scrambling means are all in operable communication with each other;

means for storing data as a virtual disk image on the particular virtual machine said means including a static disk (S) and a differencing disk (D) that are stored in a server running a remote virtual disk service;

means for storing changes to a state of the virtual disk image on a portable memory device (FD) that includes a write log for storing an entry for each sector written, a chunk cache list that lists memory chunks currently residing in the portable memory device and a fingerprint array that contains a fingerprint for each memory chunk;

means for buffering at least one read from the virtual disk image using the portable memory device;

means for flushing a memory state of the particular virtual machine associated with the virtual disk image to the portable memory device; and means for associating the memory state with a particular position on the write log on the portable memory device.

16. The system according to claim 15 wherein the retrieving means comprises:

means for mapping from a logical content hash to a physical disk block; and means for retrieving the physical disk block found, wherein the retrieving means is in operable communication with the mapping means.

17. The system according to claim 16 wherein the mapping comprises:

means for looking up, in the fingerprint array, a chunk fingerprint corresponding to the sector; and means for looking up a chunk coffesponding to the chunk fingerprint in the chunk cache and returning the sector if the chunk is present.

18. The system according to claim 17 wherein the fingerprint away is implemented using multiple files with names that encode a position in the array.

19. The system according to claim 17 wherein the virtual machine is running on a host computer within the plurality of computers and wherein a portable memory device is operably connected to the host computer, said memory device configured to store changes to a state of a virtual disk image coffesponding to the virtual machine.

20. The system according to claim 19 wherein the portable memory device is a removable flash memory device.

* * * * *

UNITED STATES PATENT AND TRADEMARK OFFICE
CERTIFICATE OF CORRECTION

| | | |
|---|---|---|
| PATENT NO. | : 7,380,051 B2 | Page 1 of 1 |
| APPLICATION NO. | : 11/058950 | |
| DATED | : May 27, 2008 | |
| INVENTOR(S) | : Andrew Birrell et al. | |

It is certified that error appears in the above-identified patent and that said Letters Patent is hereby corrected as shown below:

In column 12, line 34, in Claim 3, delete "anay," and insert -- array, --, therefor.

In column 12, line 48, in Claim 5, delete "conesponding" and insert -- corresponding --, therefor.

In column 13, line 39, in Claim 10, delete "coffesponding" and insert -- corresponding --, therefor.

In column 14, line 50, in Claim 17, delete "coffesponding" and insert -- corresponding --, therefor.

In column 14, line 54, in Claim 18, delete "away" and insert -- array --, therefor.

In column 14, line 61, in Claim 19, delete "coffesponding" and insert -- corresponding --, therefor.

Signed and Sealed this
Nineteenth Day of April, 2011

David J. Kappos
*Director of the United States Patent and Trademark Office*